March 24, 1970
F. T. SGANGA
3,502,295
TEACHING DEVICE
Filed Sept. 14, 1967
3 Sheets-Sheet 1
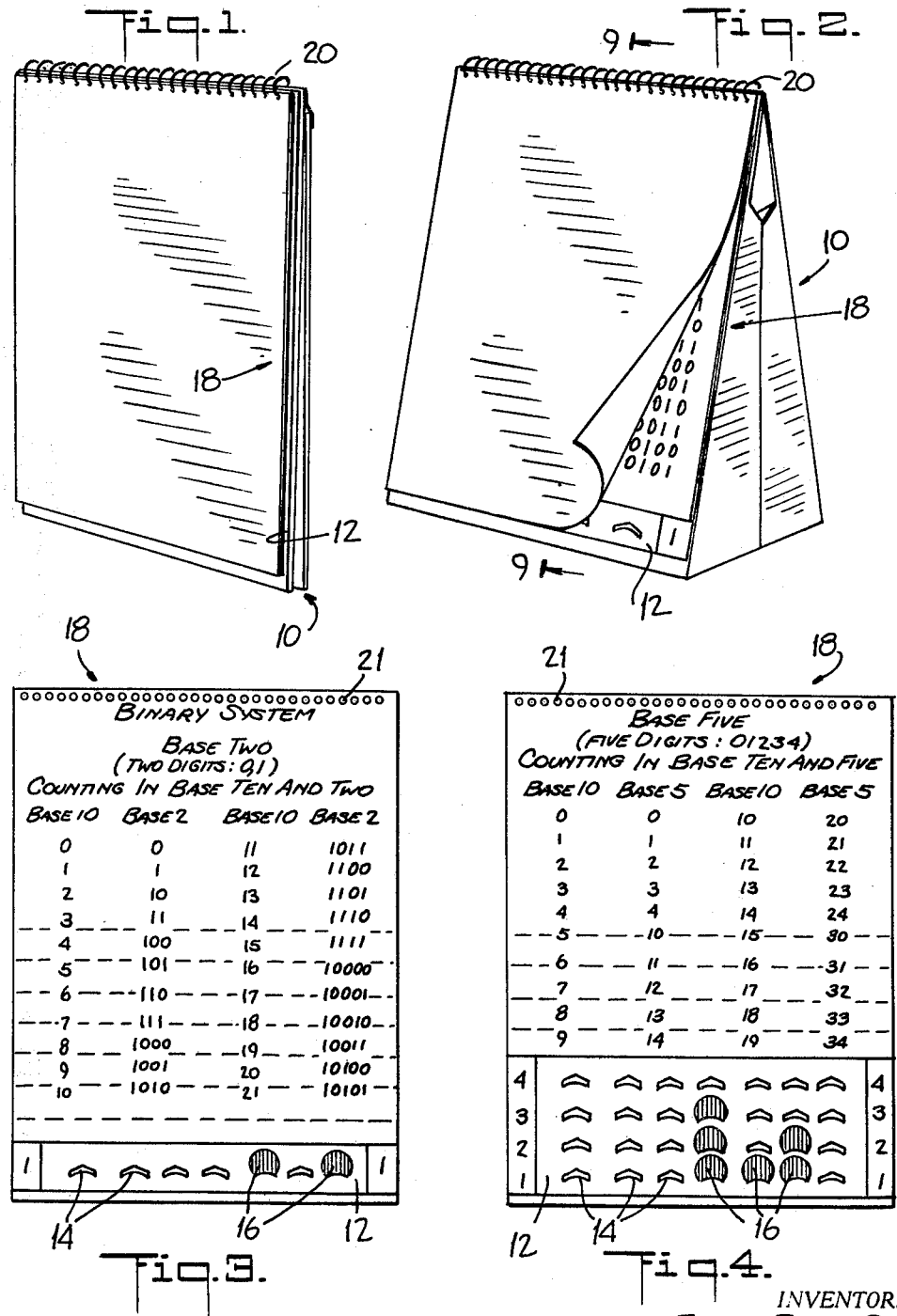
INVENTOR.
FRANCIS THOMAS SGANGA
BY
ATTORNEYS March 24, 1970　　　F. T. SGANGA　　　3,502,295
TEACHING DEVICE
Filed Sept. 14, 1967　　　　　　　　　3 Sheets-Sheet 2
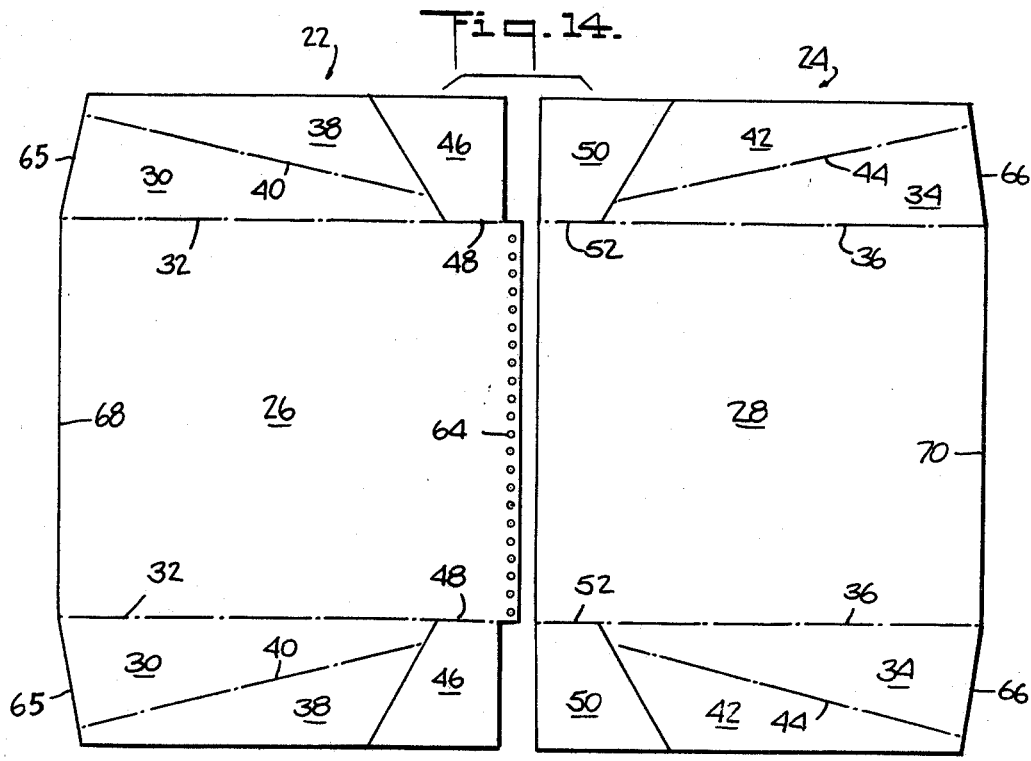
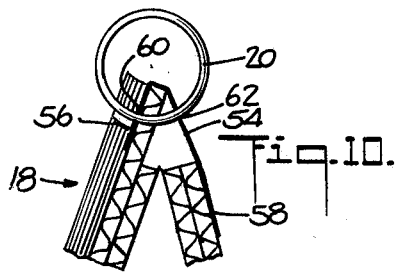
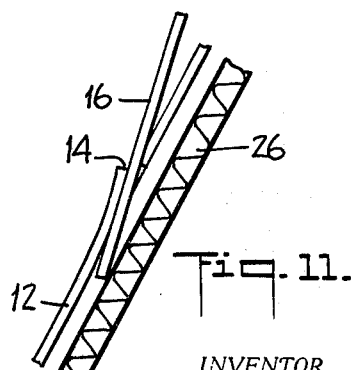
INVENTOR.
FRANCIS THOMAS SGANGA
BY
ATTORNEYS March 24, 1970  F. T. SGANGA  3,502,295
TEACHING DEVICE
Filed Sept. 14, 1967  3 Sheets-Sheet 3
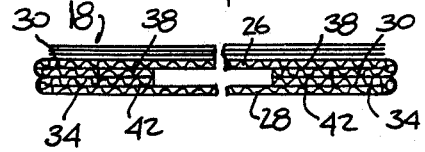
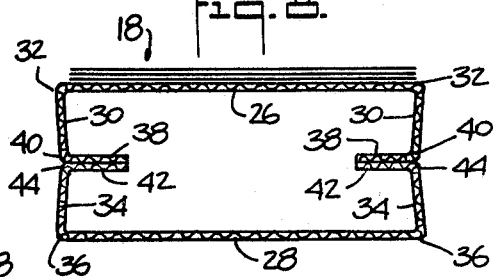
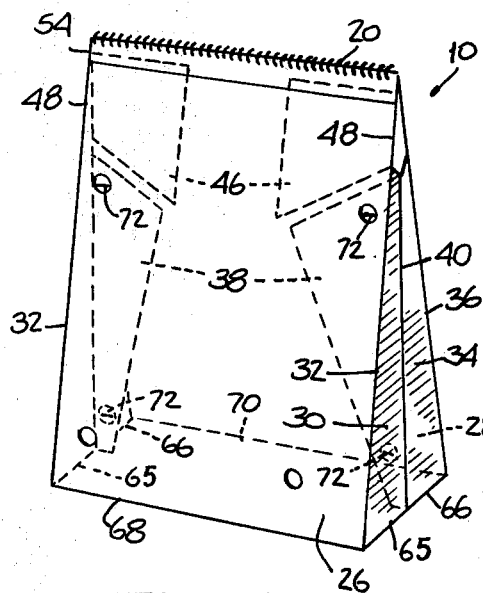
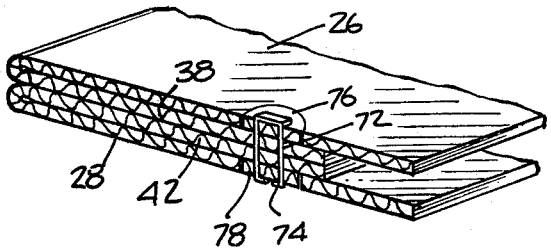
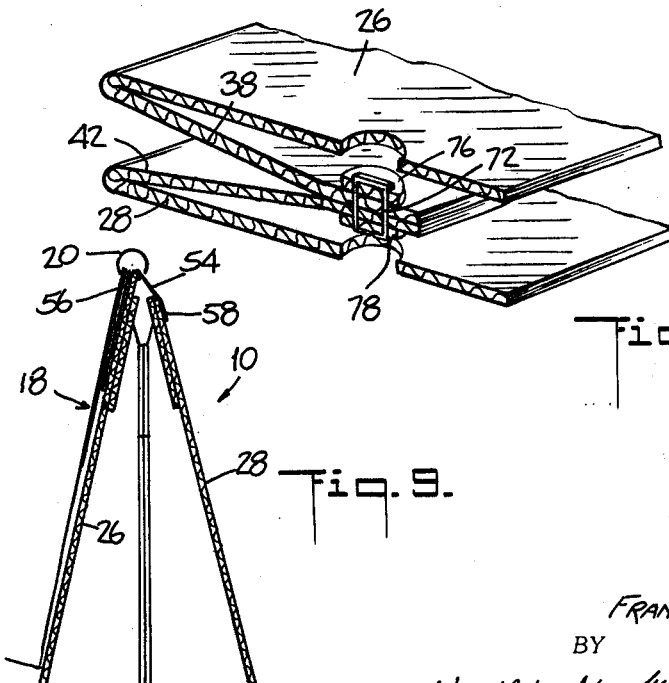
INVENTOR.
FRANCIS THOMAS SGANGA
BY
ATTORNEYS

United States Patent Office

3,502,295
Patented Mar. 24, 1970

3,502,295
TEACHING DEVICE
Francis Thomas Sganga, New Smyrna Beach, Fla., assignor to St. Regis Paper Company, New York, N.Y., a corporation of New York
Filed Sept. 14, 1967, Ser. No. 667,706
Int. Cl. A47b 97/08; B42d 3/16
U.S. Cl. 248—459                          5 Claims

ABSTRACT OF THE DISCLOSURE

A device for teaching counting in different number systems including an easel-like member having a forward face with a plurality of columns of slots, each being adapted to receive an indicator. A plurality of pages are provided which overlie the forward face, and each of the pages has indicia thereon corresponding to a particular number base and each of the pages is of a different length to expose various number of slots corresponding to its particular number base.

---

This invention relates to a teaching device and more particularly to a device for teaching counting in various number bases.

The device according to the present invention is particularly adapted, among other possible uses, for providing a way to clearly and visually effect counting in different number systems. The difference between place value and face value can easily be perceived by all students with the aid of this instructional device. That is, numbers in bases ten through two, for example, can be graphically represented by the counter.

Briefly, I provide, by way of my invention, a new and improved teaching aid which includes an easel-like member and a forward face carried by the easel-like member. The forward face has a plurality of parallel vertical columns of individual slots adapted to receive a plurality of indicators therein. Further, according to the invention, a plurality of pages are hingedly connected to the easel member to overlie the forward face, and each page has indicia thereon corresponding to a preselected number base. It will be appreciated that these pages are each of a different length in order to expose various numbers of slots which correspond to the preselected number base of that page. That is, the top page is the longest and each subsequent page is slightly shorter than the one before it. Hence, the top page exposes one horizontal line of slots and is directed to the number base two, whereas the next page thereunder exposes two horizontal lines of slots and is directed to the number base three. In like manner each of the remaining pages expose an additional line of slots. In the illustrated embodiment, the bottom page or forward face has seven vertical rows with nine slots in each row, and hence it corresponds to the number base ten.

According to one one form of my invention, the indicators are small, round discs, and for ease in counting, the discs are of different colors. Also, it is noted that in order to facilitate turning from one number base to another the pages are hingedly connected to the easel-like member along their horizontal top edge.

Still further, according to my invention, I provide a new and improved teaching aid wherein the easel-like member has angularly disposed front and back panels which are interconnected at the top by a connecting member provided for the purpose. Front and back side panels are foldably connected to the front and back panels along the side edges thereof, respectively, and front and back tuck-in panels are foldably connected to the side edges of the front and back side panels, respectively. In one embodiment of our invention the side edges between the side panels and the tuck-in panels are inwardly inclined from the bottom to the top in order to be vertically disposed when the device is in its set-up position and the front and back panels are angularly disposed. Further, the bottom edges of the side panels extend upwardly and outwardly with respect to the bottom edges of the front and back panels, respectively, in order to be horizontally exposed when in their set-up position. Still further, back tuck-in panels are foldably connected to the front and back side panels along the side edges thereof, respectively, so that in their set-up position the tuck-in panels project in face to face relationship with respect to each other and are disposed in between the front and back panels, respectively.

According to my invention, the front and back tuck-in panels are permanently adhered to each other, respectively. In one form of the invention these panels are fastened to each other by means of a staple which employs a first washer under the head and a second washer under the clinched end thereof. These washers are actually punched out of the front and back panels, respectively, thereby forming a fastener which can readily be applied through the front and back panels by punching a hole therein, and which utilize the pieces punched from the front and back panels as washers per se to facilitate the gripping action of the staple to the tuck-in panels. Moreover, this new and improved fastening means also allows the four panels to be disposed in a flattened position for storage of shipping purposes.

A further feature of the invention is the provision of a device of the aforementioned character which is of simple and practical construction, which is neat and attractive in appearance, which is relatively inexpensive to manufacture and which is otherwise well adapted for teaching purposes.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as the basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is a perspective view of a teaching device constructed according to the concepts of this invention wherein said device is in its folded or collapsed position ready for shipment or storage;

FIG. 2 is a view similar to FIG. 1, but showing the device in its set-up or operative position;

FIG. 3 is a side elevation showing a page having the number system to the base two indicated thereon;

FIG. 4 is a side elevation similar to FIG. 3, but showing a number system to the base five;

FIG. 5 is a side elevation similar to FIG. 3, but showing the number system to the base ten;

FIG. 6 is a perspective view of the easel-like member showing the set-up positions of the side panels, tuck-in panels and tuck-in tabs;

FIG. 7 is an enlarged horizontal sectional view showing the side panels and the tuck-in panels interposed between the front and back panels when the device is in its collapsed position;

FIG. 8 is an enlarged horizontal sectional view similar to FIG. 7, but showing the side panels and the tuck-in panels interposed between the front and back panels in their set-up positions;

FIG. 9 is a vertical sectional view taken along the line indicated at 9—9 in FIG. 2;

FIG. 10 is an enlarged fragmentary vertical sectional view showing the upper hinge connection;

FIG. 11 is an enlarged vertical sectional view taken substantially along the line 11—11 in FIG. 5;

FIG. 12 is a fragmentary perspective view showing the staple means for connecting the front and back tuck-in panels when the device is in its collapsed position;

FIG. 13 is a view similar to FIG. 12, but showing the connection when the front and back panels are in their set-up positions; and FIG. 14 is a plan view of the blank from which the easel-like member is fabricated.

In the illustrated embodiment of my invention, and with particular reference to FIGS. 1 and 2, the teaching device includes an easel-like member indicated generally at 10 and a forward face 12 which has a plurality of vertical columns of individual slots 14, FIGS. 3, 4 and 5, for receiving a plurality of indicators 16. This forward face may be fabricated from paperboard or the like semi-rigid sheet material. These indicators are small round circles or discs and are provided in three different columns for ease in counting. These discs may also be fabricated from paperboard or the like semi-rigid sheet material. The interrelationship of the discs 16 in the slots 14 of the forward base 12 is best seen in FIG. 11. As seen in FIGS. 1, 2 and 9, a plurality of pages indicated generally at 18 are hingedly connected along their top edges to the easel-like member 10 to overlie the forward face 12. These pages may be fabricated from heavy paper, or the like. The hinged connection 20 is in the form of a spiral wire which passes through a plurality of holes 21 in the marginal edges of each page, as shown. Other suitable connecting means may be employed, if desired.

Each of the pages 18 is adapted to overlie the forward face 12 and each page has indicia thereon corresponding to a preselected number base. Also, each page has a different length which corresponds to its particular number base. For example, the page as shown in FIG. 3 depicts the base two, and hence it is of such length that one row of slots show through from the forward face 12. FIG. 4 shows a page which has indicia thereon corresponding to the number base five. Therefore, the page is of such length that four rows of slots show through from the fold face 12. The fold face 12, or bottom page, has seven vertical rows, with nine slots in each row, and hence corresponds to the base ten.

The following is an example of the operation of my device. Attention is directed to FIG. 5, which exposes the base ten face. It is noted that the first column on the right, as viewed in FIG. 5, contains nine spaces for adding discs one at a time starting at the bottom. When the ninth disc is added, there is no more room for adding the tenth disc. Since adding one more disc in the first column is not possible, a different colored disc is place at the bottom of the ten's column. This disc will represent ten after the nine discs are removed from the first column. Then, the first column is ready for refilling. When it is again filled with nine discs, a second disc is place in the ten's column, and again the nine discs are removed in the first column. The second discs in the ten's column represents two ten or twenty units. When the one's and ten's columns are filled (showing 99), then one disc at the base of the one hundred's column will show one hundred when the one's and ten's columns are emptied. This procedure demonstrates the unique feature of this teaching aid. That is, there is a limit to the number of discs that can be placed in each column. This limit is automatically achieved as the pages are flipped over exposing each number base system in order from base ten to base two. Attention is next directed to FIG. 4 which exposes the base five face. It is noted that only four rows of slits are exposed. Since there is no five in base four, the counting in each column is limited to four. Hence, when four discs are added, one by one, to the one's column on the right, the column is filled. Since there is no space for adding one more disc in the one's column, the next disc spills over and a different color disc is added at the bottom of the next column to the left, as viewed in FIG. 4, and the four discs in the one's column are removed. The disc in the second column represents one group of five's or five units but is written one oh, in the base five. In the illustration of FIG. 4, the numerals are read three, one, two, oh, base five. The words "ten" and "hundred" are not used since they refer to base ten numbers.

As best seen in FIG. 14, the easel-like member is formed from a front blank indicated generally at 22 and a back blank indicated generally at 24. These blanks may be fabricated from double faced corrugated sheet material having two outwardly facing plies and a corrugated ply disposed therebetween. The blanks comprise a front panel 26 and a back panel 28. A front side panel 30 is connected to each side edge of the front panel 26 along score lines 32 for folding, and a back side panel 34 is connected to each side edge of the back panel 28 along score lines 36 for folding. Further, front tuck-in panels 38 are connected to the side edges of the front side panels 30, respectively, along score lines 40; the back tuck-in panels 42 are connected to the side edges of the back side panels 34 respectively, along score lines 44 for folding. Also, front tuck-in tabs 46 are connected to each side edge of the front panel along score lines 48 for folding and back tuck-in tabs 50 are connected to each side edge of the back panel 28 along score lines 52 for folding.

Referring now to FIG. 6, the easel-like member 10 is shown in the set-up position. In order to connect the front panel 26 to the back panel 28, a connecting member 54 is employed, which may be in the form of a narrow tape. As best seen in FIGS. 9 and 10, the connecting number 54 is permanently adhered to the front panel, as at 56, and to the back panel 28 as at 58. The hinged member 20 passes through the connecting member 54 in two places such as 60 and 62. Also, the hinged member passes through the hole 64, FIG. 14, in the front panel. In this manner the front and back panels are hingedly interconnected.

Referring to FIGS. 6 and 8, it is seen that the front and back side panels 30 and 34 have been spread apart at their bottoms so that the device will stand up by itself. The front side panels 30 and the back side panels 34 have been folded substantially perpendicular to the front panel and back panel along fold lines 32 and 36, respectively, thereby forming the sides of the easel-like member. The front tuck-in panels 38 have been folded substantially perpendicular to the front of side panels 30 along fold lines 40, and the back tuck-in panels 42 have been folded substantially perpendicular to the back side panels 34 along fold lines 44. It will be appreciated that the side edges or fold lines 40 and 44 (FIG. 14) between the side panels and the tuck-in panels are inwardly inclined from the bottom to the top in order to be vertically disposed when the device is in its set-up position, as seen in FIG. 6. Further, the bottom edges 65 and 66 of the front and back side panels 30 and 34, respectively, extend upwardly and outwardly as viewed in FIG. 14 with respect to the bottom edges 68 and 70 of the front and back panels, respectively, so that they will be horizontally disposed when the device is in its set-up position as seen in FIG. 6. It is noted that the front and back tuck-in tabs 46 and 50 are folded inwardly in face to face relationship with respect to each other along fold lines 48 and 52, respectively.

The front and back tuck-in panels 38 and 42 are permanently adhered to each other in face to face relationship. As best seen in FIG. 12, a U-shaped staple 72 is driven down through the panel 26, front tuck-in panel 38, back tuck-in panel 42 and back panel 28, and the bottom ends thereof are clinched over against the back panel 28 as at 74. Then, a disc-shaped washer 76 is cut from the front panel 26 and a second disc-shaped washer 78 is cut from the back panel 28, thereby forming a fastener which utilizes two washers to facilitate the gripping action and substantially strengthens the connection. Moreover, this fastener is simple to fabricate, and further it allows the four panels to be disposed in a flattened position with respect to each other for storage or shipping purposes. As seen in FIG. 6 two staples are employed to hold each pair of tuck-in panels.

The device may be readily moved from its set-up position as seen in FIG. 8 to its collapsed position as seen in FIG. 7. That is, the front and back panels 26 and 28 are moved towards each other and the front and back side panels are tucked in between the front and back panels in face to face relationship with respect to each other. In the collapsed position, as seen in FIG. 7, the device is readily transportable or stored, as desired.

From the foregoing description, it will be seen that the present invention contributes a new and improved teaching device for simply and effectively teaching counting methods in different number systems.

Although a particular embodiment of the invention has herein been described for the purposes of explanation, further modification thereof, after study of this specification, will be apparent to those skilled in the art to which the invention pertains.

What is claimed and desired to be secured by Letters Patent is:

1. An easel-like member for use in forming a teaching device comprising angularly disposed front and back panels, a flexible tape-like connecting member interconnecting said front and back panels, front side panels foldably connected to the front panel along the side edges thereof respectively, front tuck-in panels foldably connected to the front side panels along the side edges thereof respectively, back side panels foldably connected to the back panel along the side edges thereof respectively, back tuck-in panels foldably connected to the back side panels along side edges thereof respectively, said front tuck-in panels and said back tuck-in panels projecting in face to face relationship with respect to each other between said front and back panels respectively, said front tuck-in panels and said back tuck-in panels being adhered to each other, respectively, and a spiral wire-like hinge connection which passes through said flexible tape-like connecting member and also passes through said front panel adjacent said connecting member.

2. An easel-like member for use in forming a teaching device comprising angularly disposed front and back panels, a connecting member interconnecting said front and back panels, front side panels foldably connected to the front panel along the side edges thereof respectively, front tuck-in panels foldably connected to the front side panels along the side edges thereof respectively, back side panels foldably connected to the back panel along the side edges thereof respectively, back tuck-in panels foldably connected to the back side panels along side edges thereof respectively, said front tuck-in panels and said back tuck-in panels projecting in face to face relationship with respect to each other between said front and back panels repectively, and said front tuck-in panels and said back tuck-in panels being adhered to each other, respectively, said front tuck-in panel and said back tuck-in panel are adhered to each other by means of a staple having a washer disposed adjacent the head thereof, and a washer disposed adjacent the clinched end thereof, said washers being cut from adjacent portions of the front and back panels respectively.

3. An easel-like member for use in forming a teaching device comprising angularly disposed front and back panels, a connecting member interconnecting said front and back panels, front side panels foldably connected to the front panel along the side edges thereof respectively, front tuck-in panels foldably connected to the front side panels along the side edges thereof respectively, back side panels foldably connected to the back panel along the side edges thereof respectively, back tuck-in panels foldably connected to the back side panels along side edges thereof respectively, said front tuck-in panels and said back tuck-in panels projecting in face to face relationship with respect to each other between said front and back panels repectively, and said front tuck-in panels and said back tuck-in panels being adhered to each other, respectively, front tuck-in tabs foldably connected to the front panel along the side edges thereof respectively, and back tuck-in tabs connected to the back panel along the side edges thereof respectively, said front and back tuck-in tabs being interposed between said front and back panels respectively.

4. A pair of blanks for forming an easel-like member, a combination comprising a front panel and a back panel, front side panels connected to the side edges of said front panel along score lines for folding, back side panels connected to the side edges of said back panel along score lines for folding, front tuck-in panels connected to the side edges of said front side panels along score lines respectively for folding, back tuck-in panels connected to the side edges of said back side panels along score lines respectively for folding, a pair of front tuck-in tabs connected to the side edges of said front panel along score lines for folding, and a pair of back tuck-in tabs connected to the side edges of said back panel along score lines for folding.

5. A pair of blanks according to claim 4 wherein said blanks are fabricated from double faced corrugated sheet material having two outwardly facing plies and a corrugated ply disposed therebetween.

References Cited

UNITED STATES PATENTS

| 2,302,677 | 11/1942 | Crane | 229—22 X |
| 2,361,923 | 11/1944 | Arneson | 229—22 X |
| 3,034,695 | 5/1962 | Berghgracht | 229—22 |

FOREIGN PATENTS 299,825  11/1928  Great Britain.

ROY D. FRAZIER, Primary Examiner

F. DOMOTOR, Assistant Examiner

U.S. Cl. X.R.

248—174; 281—33